(12) United States Patent
Marrelli et al.

(10) Patent No.: US 10,104,232 B2
(45) Date of Patent: Oct. 16, 2018

(54) SYSTEM AND METHOD FOR A COGNITIVE SYSTEM PLUG-IN ANSWERING SUBJECT MATTER EXPERT QUESTIONS

(71) Applicant: International Business Machines Corporation, Armonk, NY (US)

(72) Inventors: Carl M. Marrelli, Westerville, OH (US); Jeffrey T. Matteo, Powell, OH (US); Ram S. Narayanan, Canton, MI (US); Martin Oberhofer, Bondorf (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/208,137

(22) Filed: Jul. 12, 2016

(65) Prior Publication Data

US 2018/0020094 A1    Jan. 18, 2018

(51) Int. Cl.
*H04M 3/00* (2006.01)
*H04M 3/51* (2006.01)
(Continued)

(52) U.S. Cl.
CPC .... *H04M 3/5175* (2013.01); *G06F 17/30654* (2013.01); *G06N 5/043* (2013.01);
(Continued)

(58) Field of Classification Search
CPC . G10L 15/22; G10L 15/1815; G10L 15/1822; G10L 15/08; G10L 2015/085;
(Continued)

(56) References Cited

U.S. PATENT DOCUMENTS 7,987,151 B2  7/2011 Schott et al.
8,229,734 B2  7/2012 Bennett
(Continued)

OTHER PUBLICATIONS

Gilbert, M. et al. (2005). Intelligent virtual agents for contact center automation. IEEE Signal Processing Magazine, 22(5).
(Continued)

*Primary Examiner* — Ahmad F. Matar
*Assistant Examiner* — Kharye Pope
(74) *Attorney, Agent, or Firm* — Pepper Hamilton LLP (57) ABSTRACT

Embodiments provide a system and method for integrating a cognitive system into a call center. The system and method include ingesting, through an instant messaging application, one or more original questions from one or more call center agents; ingesting, through the instant messaging application, one or more answers associated with the one or more original questions; receiving, through the instant messaging system, one or more additional questions; determining one or more proposed answers to each additional question based on analysis of the one or more original questions and answers; determining a confidence score for each of the one or more proposed answers; if the confidence score of the proposed answer exceeds a confidence threshold, providing the proposed answer to the call center agent; receiving, through a feedback module, feedback on the proposed answer from one or more subject matter experts or call center managers; and incorporating the feedback on the proposed answer into the analysis of the one or more original questions.

20 Claims, 4 Drawing Sheets (51) Int. Cl.
*G06N 5/04* (2006.01)
*G06N 7/00* (2006.01)
*H04L 12/58* (2006.01)
*G06F 17/30* (2006.01)
*H04M 5/00* (2006.01)
*H04L 12/66* (2006.01)
*H04M 3/42* (2006.01)

(52) U.S. Cl.
CPC ............ *G06N 7/005* (2013.01); *H04L 51/00* (2013.01); *H04M 3/5166* (2013.01); *H04M 3/42382* (2013.01); *H04M 2203/401* (2013.01)

(58) Field of Classification Search
CPC ....... G10L 15/193; G10L 15/32; G10L 13/08; G10L 15/04; H04M 3/4936; H04M 2201/40; H04M 2201/10; H04M 2201/39; H04M 3/4931; H04M 2250/74; H04M 3/4938; G06F 17/30976; G06F 17/2785; G06F 17/279; G06F 17/28; G06F 17/289; G06F 17/30867; G06F 17/27; G06F 17/30654; G06F 17/30023; G06F 17/3064; G06F 17/30684
USPC ...... 704/275, 9, 257, E15.04, 240, 251, 231, 704/235, E15.001, E15.005, E15.044; 379/218.01, 88.01, 218.02
See application file for complete search history.

(56) References Cited

U.S. PATENT DOCUMENTS

| | | | |
|---|---|---|---|
| 2003/0167320 A1* | 9/2003 | Perez | G06F 9/465 709/223 |
| 2003/0179876 A1* | 9/2003 | Fox | H04M 3/51 379/265.02 |
| 2004/0203629 A1 | 10/2004 | Dezonno et al. | |
| 2005/0086290 A1* | 4/2005 | Joyce | G06Q 10/06 709/202 |
| 2005/0278340 A1* | 12/2005 | Rehberg | G06Q 10/00 |
| 2005/0288981 A1 | 12/2005 | Elias et al. | |
| 2008/0195378 A1* | 8/2008 | Nakazawa | G06F 17/30654 704/9 |
| 2011/0125734 A1 | 5/2011 | Duboue et al. | |
| 2012/0016206 A1 | 1/2012 | Ramarajan | |
| 2012/0224020 A1* | 9/2012 | Portman | H04M 3/5133 348/14.02 |
| 2013/0013546 A1 | 1/2013 | Bagchi et al. | |
| 2013/0165068 A1* | 6/2013 | Keller | H04M 3/42382 455/404.1 |
| 2013/0262168 A1* | 10/2013 | Makanawala | H04L 51/32 705/7.14 |
| 2014/0044250 A1* | 2/2014 | Gartner | H04M 3/00 379/265.09 |
| 2014/0119531 A1* | 5/2014 | Tuchman | H04M 3/5166 379/265.09 |
| 2014/0149163 A1* | 5/2014 | Dempski | G06Q 10/20 705/7.15 |
| 2014/0214975 A1* | 7/2014 | Blecon | H04L 51/04 709/206 |
| 2014/0282083 A1* | 9/2014 | Gaetano, Jr. | H04L 51/04 715/752 |
| 2015/0006460 A1* | 1/2015 | Skiba | G06N 5/022 706/50 |
| 2015/0032724 A1* | 1/2015 | Thirugnanasundaram | G06F 17/30654 707/722 |
| 2015/0044659 A1 | 2/2015 | Basu | |
| 2015/0186784 A1 | 7/2015 | Barborak | |
| 2015/0281454 A1* | 10/2015 | Milstein | G06Q 10/1097 379/265.12 |
| 2015/0347900 A1* | 12/2015 | Bell | G06N 5/02 706/11 |
| 2016/0092792 A1 | 3/2016 | Chandrasekaran et al. | |
| 2016/0110347 A1* | 4/2016 | Kennewick, Jr. | G06F 17/30654 704/9 |
| 2016/0125751 A1* | 5/2016 | Barker | G06F 17/3053 434/322 |
| 2016/0132608 A1* | 5/2016 | Rathod | G06F 17/30867 707/722 |
| 2016/0191709 A1* | 6/2016 | Pullamplavil | H04M 3/5133 379/266.07 |
| 2016/0259775 A1* | 9/2016 | Gelfenbeyn | G06F 17/279 |

OTHER PUBLICATIONS

Tecuci, G. et al. (2007). Seven aspects of Mixed-Initiative Reasoning: An Introduction to this Special Issue on Mixed-Initiative Assistants. AI Magazine, 28(2).

Yuan et al., "Watson and healthcare: How natural language processing and semantic Search could revolutionize clinical decision support," IBM developerWorks, Apr. 12, 2011.

High, "The Era of Cognitive Systems: An Inside Look at IBM Watson and How it Works," IBM Redbooks, Dec. 12, 2012.

Notice of Allowance dated Feb. 28, 2018 in corresponding U.S. Appl. No. 15/208,134.

Office Action dated Aug. 24, 2017 in related U.S. Appl. No. 15/208,134.

* cited by examiner

SYSTEM AND METHOD FOR A COGNITIVE SYSTEM PLUG-IN ANSWERING SUBJECT MATTER EXPERT QUESTIONS

TECHNICAL FIELD

The present application relates generally to a system and method that can be used to practically integrate cognitive technology into the systems of a call center.

BACKGROUND

Call centers have evolved over the past decades into highly efficient systems. Introducing a discontinuous technology solution into an efficient call center can adversely impact key performance metrics such as average handle time and customer satisfaction. This can pose a challenge for introducing cognitive technology into a call center, as many traditional products require a training period to adapt the system to the specific use case.

Call center agents rely on collaboration and guidance from seasoned team members (also known as subject matter experts (SME)) to effectively and efficiently serve customers. Prior art cognitive products require a manual training period to adapt the solution to the specific industry domain and to train models against the natural language utterances common to the specific use case. During this training period, the ability of the prior art cognitive systems to return acceptable answers is relatively low. Traditional models require the call center agents to correct the system when an incorrect answer is given, but typically call center agents have little time to perform this function and will discard systems that are overly cumbersome.

SUMMARY

Embodiments can provide a computer implemented method, in a data processing system comprising a processor and a memory comprising instructions which are executed by the processor to cause the processor to implement a call center question and answer system, the method comprising ingesting, through an instant messaging application, one or more original questions from one or more call center agents; ingesting, through the instant messaging application, one or more answers associated with the one or more original questions; receiving, through the instant messaging system, one or more additional questions; determining one or more proposed answers to each additional question based on analysis of the one or more original questions and answers; determining a confidence score for each of the one or more proposed answers; if the confidence score of the proposed answer exceeds a confidence threshold, providing the proposed answer to the call center agent; receiving, through a feedback module, feedback on the proposed answer from one or more subject matter experts or call center managers; and incorporating the feedback on the proposed answer into the analysis of the one or more original questions.

Embodiments can further provide a method further comprising utilizing a plug-in module to moderate the interactions between the cognitive system and the instant messaging application.

Embodiments can further provide a method wherein the plug-in module utilizes one or more registration commands to identify the one or more questions and answers sent between the instant messaging application and the cognitive system.

Embodiments can further provide a method further comprising ingesting, through the instant messaging application, one or more answers provided by one or more subject matter experts.

Embodiments can further provide a method further comprising providing the proposed answer to the call center agent through the instant messaging application.

Embodiments can further provide a method further comprising using the cognitive system to determine the confidence threshold needed to provide a proposed answer.

Embodiments can further provide a method further comprising flagging, through the feedback module, one or more answers as unsuitable for display.

In another illustrative embodiment, a computer program product comprising a computer usable or readable medium having a computer readable program is provided. The computer readable program, when executed on a processor, causes the processor to perform various ones of, and combinations of, the operations outlined above with regard to the method illustrative embodiment.

Embodiments can further provide a method for cognitive system integration into a call center using an instant messaging application, the method comprising ingesting one or more original questions entered into the instant messaging application by one or more call center agents; ingesting one or more answers associated with the one or more original questions entered into the instant messaging application; receiving one or more additional questions through the instant messaging system; determining one or more proposed answers to each additional question based on analysis of the one or more original questions and answers by a cognitive system; determining a confidence score for each of the one or more proposed answers; if the confidence score of the proposed answer exceeds a confidence threshold, providing the proposed answer to the call center agent; and receiving feedback on the proposed answer from one or more subject matter experts or call center managers through a feedback module.

Embodiments can further provide a method further comprising ingesting one or more answers provided by one or more subject matter experts through the instant messaging application.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within in the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. IBM Watson™ is an example of one such cognitive system which can process human readable language and identify inferences between text passages with human-like accuracy at speeds far faster than human beings and on a much larger scale. In general, such cognitive systems are able to perform the following functions:

- Navigate the complexities of human language and understanding
- Ingest and process vast amounts of structured and unstructured data
- Generate and evaluate hypotheses
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situation awareness that mimic human cognition based on experiences
- Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area (e.g., financial domain, medical domain, legal domain, etc.) where the body of knowledge (knowledgebase) can be organized in a variety of configurations, e.g., a structured repository of domain-specific information, such as ontologies, or unstructured data related to the domain, or a collection of natural language documents about the domain.

Content users input questions to the cognitive system which implements the QA pipeline. The QA pipeline then answers the input questions using the content in the corpus or data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using natural language processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e., candidate answer, is inferred by the question. This process is repeated for each of the candidate answers until the QA pipeline identifies candidate answers that surface as being significantly stronger than others and thus generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify question and answer attributes of the content.

Operating on such content, the QA pipeline generates answers for input questions using a plurality of intensive analysis mechanisms which evaluate the content to identify the most probable answers, i.e., candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

In an embodiment, a cognitive system with a QA pipeline can be unobtrusively integrated into a functioning call center in order for the call center to realize the benefits of the advanced cognitive service. The integration can create a closed-loop system that can provide means for accelerated adaptation of the cognitive system in both a configuration and adaptation phase, as well as a run-time and feedback phase.

Figure 1:
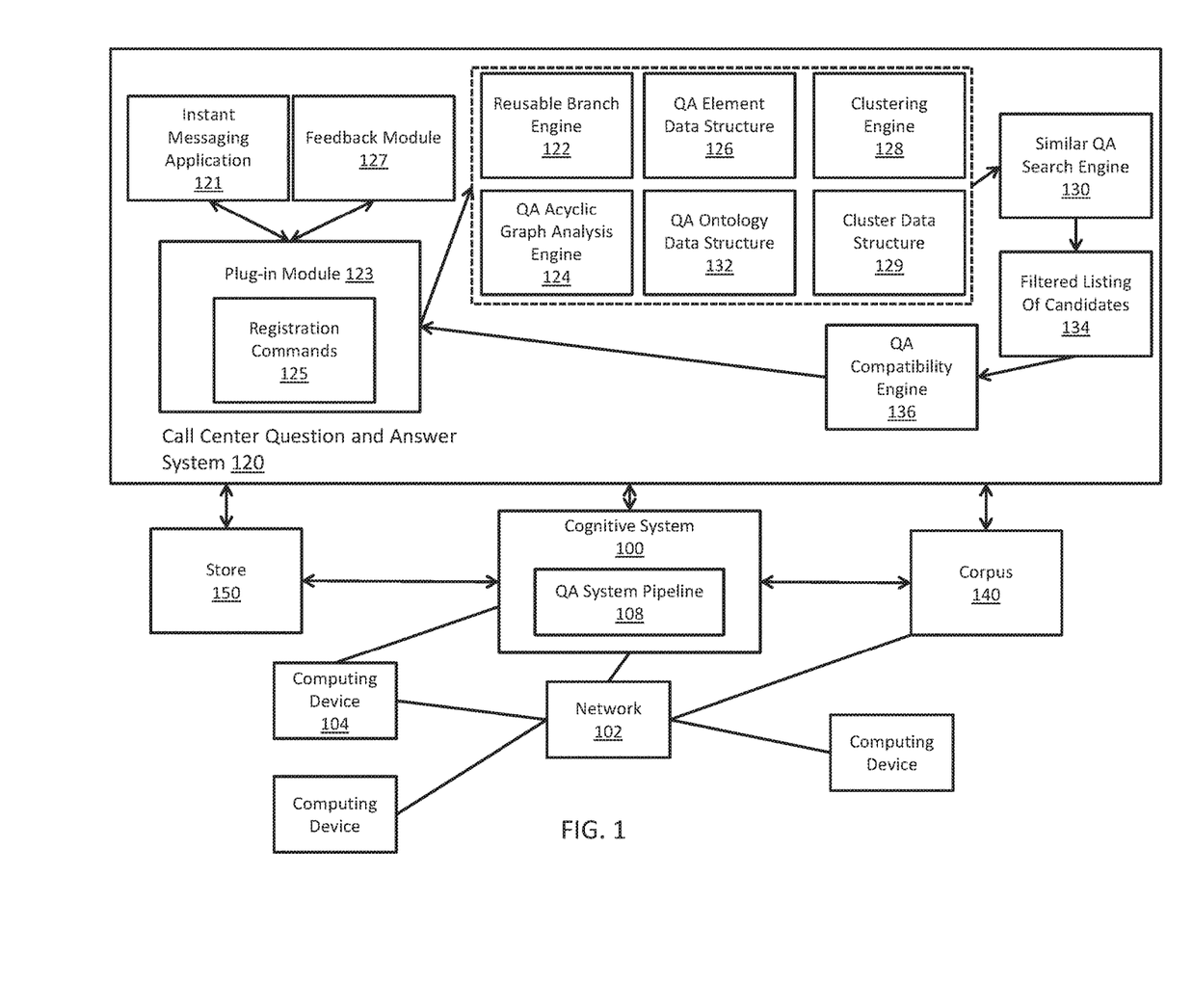
FIG. 1 depicts a schematic diagram of one illustrative embodiment of a cognitive system implementing a call center question and answer (QA) system in a computer network.

FIG. 1 depicts a schematic diagram of one illustrative embodiment of a cognitive system 100 implementing a question and answer (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices. Other embodiments of the cognitive system 100 may be used with components, systems, sub-systems, and/or devices other than those that are depicted herein.

The cognitive system 100 is configured to implement a QA pipeline 108 that receive inputs from various sources. For example, the cognitive system 100 receives input from the network 102, a corpus of electronic documents 140, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 140. Portions of the corpus of data 140 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 140 for use as part of a corpus of data with the cognitive system 100. The document includes any file, text, article, or source of data for use in the cognitive system 100. Call center QA system users access the cognitive system 100 via a network connection or an Internet connection to the network 102, and input questions to the cognitive system 100 that are answered by the content in the corpus of data 140. In one embodiment, the questions are formed using natural language. The cognitive system 100 parses and interprets the question via a QA pipeline 108, and provides a response to the cognitive system user containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 140. The QA pipeline 108 generates answers for the input question based on the processing of the input question and the corpus of data 140. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question, which it then parses to extract the major features of the question, and which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e., candidate answer, is inferred by the question. This process is repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, in accordance with some illustrative embodiments, the cognitive system 100 is further augmented, in accordance with the mechanisms of the illustrative embodiments, to include logic implemented in specialized hardware, software executed on hardware, or any combination of specialized hardware and software executed on hardware, for integrating a call center question and answer (QA) system 120.

The call center QA system can include an instant messaging (IM) application 121, which can have one or more chat channels that can be used by one or more call center agents and/or one or more subject matter experts (SME). Traditionally, if a call center agent encounters a question they cannot answer, the call center agent will contact the subject matter expert through the chat channel to obtain the correct answer, which the call center agent can then relay to the customer making the initial inquiry. Alternate embodiments contemplate other technical support or help desk models using agent and expert interactions.

To interact with the instant messaging application 121, the call center QA system 120 can have a plug-in module 123 that can interface with the IM application 121 in real-time in order to begin to collect the data transmitted through the IM application 121. The IM application 121 used can provide a way for the plug-in module 123 to register itself with the IM application 121 and one or more protocols for exchanging data. This can be accomplished through the use of one or more registration commands 125, which can be used to send questions from the IM application 121 to the cognitive system 100.

A registration command 125 can be prepended to every user entry, and can send the text (or utterance) entered into the IM application 121 to the plug-in module 123, which can be designed to call the cognitive system 100 through a request method (for example, HTTP POST). Entered text routed to the cognitive system 100 can be designated by token, team ID, channel ID, channel name, user ID, and/or user name. At the cognitive system 100 level, the information can be received from an outbound command or webhook. At runtime, the utterance can be processed and, if a confident response is produced by the cognitive system 100, the response can be returned to the IM application 121 through an incoming command or webhook. In an embodiment, the threshold for response confidence can be controlled by the cognitive system 100.

One or more utterances received from call center agent/SME interactions can be subjected to natural language processing techniques of the cognitive system 100 and/or call center QA system 120 to transform the questions into acyclic graphs where nodes represent potential facts, and connectors represent the overall connections between the potential facts. This operation may be performed, for example, as part of an ingestion operation of the cognitive system 100 which reads the natural language text of the electronic documents or asked questions, parses the natural language text and performs natural language processing on the natural language text, including performing annotation operations using annotators, to extract key features and facts of the natural language text which are then converted to the acyclic graphs.

The acyclic graphs of the analyzed QA pairs are stored in storage device 150 associated with either the cognitive system 100 or the call center QA system 120, where the storage device 150 may be a memory, a hard disk based storage device, flash memory, solid state storage device, or the like (hereafter assumed to be a "memory" with in-memory representations of the acyclic graphs for purposes of description). The in-memory acyclic graphs are then analyzed by the reusable branch engine 122 of the call center QA system 120 to identify reusable branches within the acyclic graphs and a reusable branch data structure having entries for each reusable branch found in this way, and other reusable branches either found in other corpora, readily known and pre-populated in the reusable branch data structure by subject matter experts, or the like, is generated. The identification of the reusable branches may further be associated with the in-memory acyclic graph of the corresponding question as well so as to identify for the particular knowledge domain what the reusable branches are in the knowledge domain.

Either as part of an ingestion operation, or by the QA acyclic graph analysis engine 124 analyzing the acyclic graphs generated by the ingestion operation, a QA element data structure 126 defining the various knowledge domains in the ingested corpus 140, as well as other QA elements pre-populated in the QA element data structure 126 either through analysis of other corpora or through manual input by subject matter expert/call center agent interaction, is generated.

The QA element data structure 126 is analyzed by clustering engine 128 to identify clusters of QA elements based on their characteristics. For example, QA elements may be clustered according to similar QA element types to form QA element clusters. These clusters may be stored in a cluster data structure 129. As noted above, some QA elements may have sub-elements and various levels of clustering may be performed, which may be classified/clustered into other clusters. Thus, the same QA element may be present in multiple clusters.

In response to receiving the input utterance, a similar QA element search engine 130 performs a search of the cluster data structure 129 to generate a listing of the QA element clusters that involve the given new QA element(s). In making this list, the cluster search engine 130 may analyze the clusters of reusable branches that contain the new QA element to produce an initial list of candidate QA elements. This listing is then extended with candidate QA elements for similar QA elements obtained from clusters with which the elements of the reusable branches involving the new QA element are clustered.

Alternatively, the clustering performed by the clustering engine 128 may be performed after the identification of similar QA elements to those of the reusable branches found as having the new QA element(s), performed by the similar QA element search engine 130 and the list may then be extended with candidate QA elements for similar QA elements by using a provided QA ontology data structure 132. Those candidate elements may be included in the listing and the listing may be analyzed by the clustering engine 128 to generate clusters of QA elements for storage in the cluster data structure 129.

In either case, the similar QA element search engine 130 then determines whether the presented question already contains any of the clusters of candidate QA elements, i.e., the clusters identified as having the new QA element(s) in the request. For those that are already present within the utterance, the candidate clusters may be promoted in the listing to generate a filtered listing of candidate QA elements and their clusters 134.

The QA element clusters in the filtered listing of candidate QA elements 134 are then analyzed by a QA element compatibility engine 136 to identify which of the element clusters are compatible with the knowledge domain of the question that is to be answered. The QA element compatibility engine 136 may utilize configured association rules learned during a training of the call center QA system 120 and knowledge base, where the association rules specify compatibility of QA elements with different knowledge domains. Using these association rules, the QA element compatibility engine determines what combinations or patterns of one or more QA elements are found in questions asked by subject matter experts working in the same knowledge domain. The intersection of the association rules with the candidate QA element clusters indicates which element clusters are compatible with the knowledge domain. The resulting candidate clusters that intersect with the association rules may then be ranked by the QA element compatibility engine 136, such as based on frequency of appearance of the clusters or QA elements in the clusters. Other ranking criteria may also be utilized as noted above.

A QA element cluster in the filtered listing of candidate clusters 134, which also intersects with one or more of the association rules, is selected by the QA element compatibility engine 136 for use in providing an answer to a question. This selection may be based on the ranking of the clusters intersecting the association rules as discussed above. For example, a top ranked cluster may be selected for use in presenting an answer to the utterance. Alternatively, other selection criteria may be utilized as well, such as in an implementation where ranking of the clusters may not be performed, as previously discussed above.

Additionally, subject matter experts and call center manager may make use of a feedback module 127, which can interact with the cognitive system 100 in essentially the same manner as the IM application 121, in order to evaluate and analyze answers provided by the cognitive system 100 in response to one or more utterances, allowing for further training of the cognitive system 100. In an embodiment, the feedback module 127 can be incorporated into the IM application 121 to provide seamless feedback. Thus, the mechanisms of the illustrative embodiments provide an intelligent cognitive system 100 for integration into a call center question and answer system 120 that can allow one or more call center agents to interact with a cognitive system 100 as if it were a subject matter expert.

Figure 2:
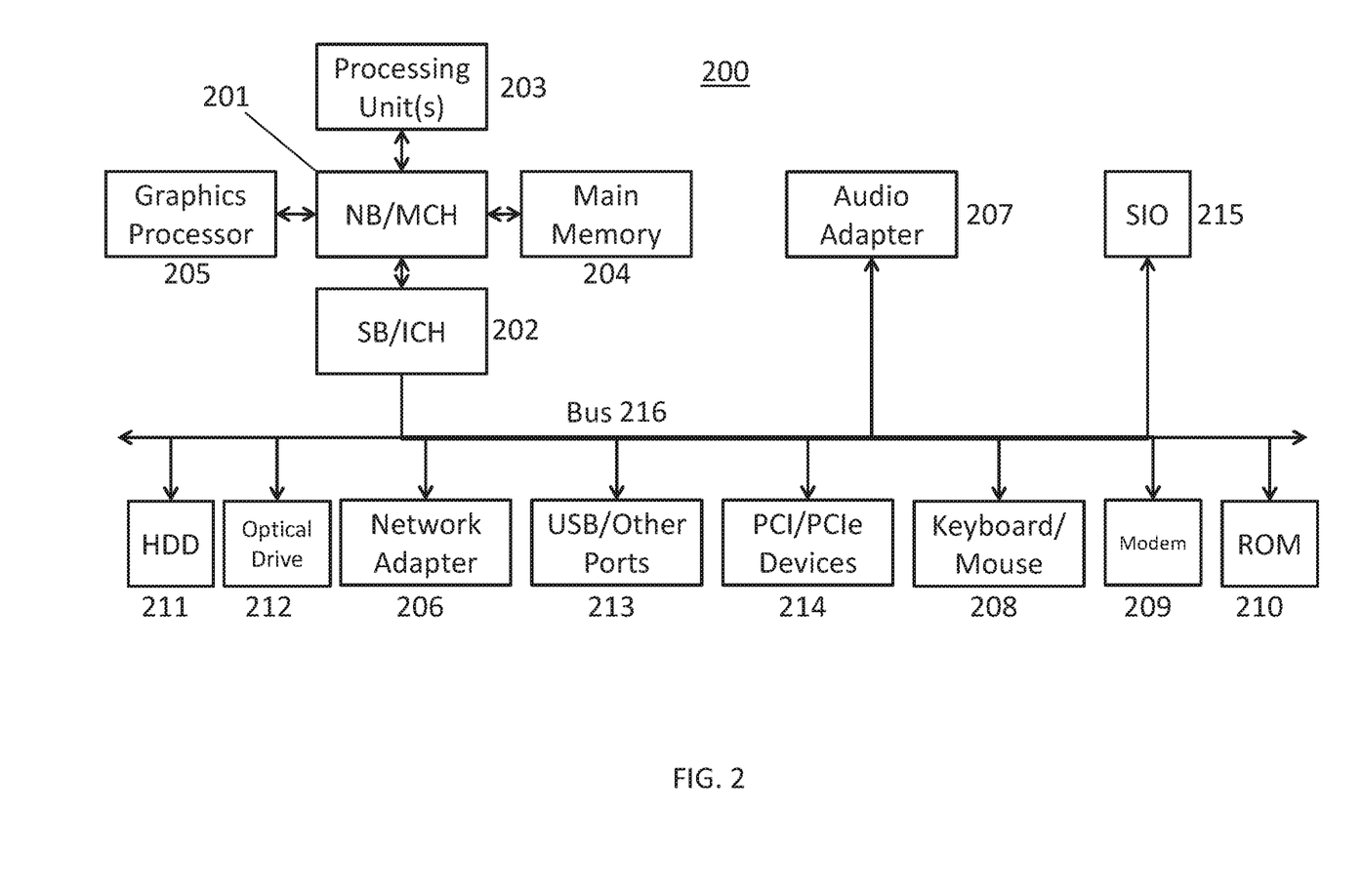
FIG. 2 is a block diagram of an example data processing system in which aspects of the illustrative embodiments are implemented.

FIG. 2 is a block diagram of an example data processing system 200 in which aspects of the illustrative embodiments are implemented. Data processing system 200 is an example of a computer, such as a server or client, in which computer usable code or instructions implementing the process for illustrative embodiments of the present invention are located. In one embodiment, FIG. 2 represents a server computing device, such as a server, which implements the call center QA system 120 and cognitive system 100 described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer™ System p® running the Advanced Interactive Executive operating system or the Linux operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the call center QA system can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. Other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
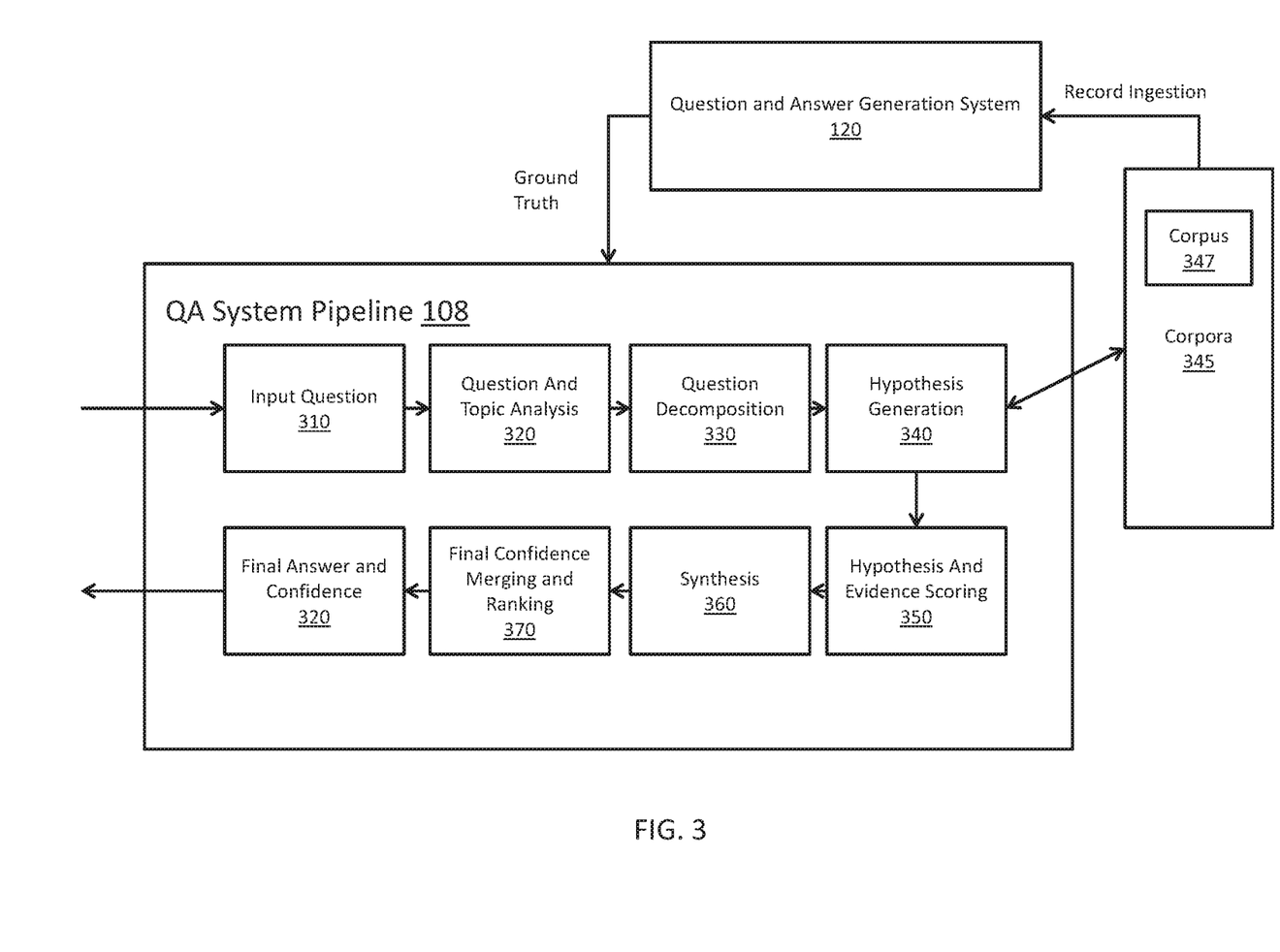
FIG. 3 illustrates a QA system pipeline, of a cognitive system, for processing an input question generated from the call center QA system in accordance with one illustrative embodiment.

FIG. 3 illustrates a QA system pipeline, of a cognitive system, for processing an input utterance in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc., are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 108 may be provided for interfacing with the pipeline 108 and implementing the improved functionality and operations of the illustrative embodiments.

As shown in FIG. 3, the QA pipeline 108 comprises a plurality of stages 310-380 through which the cognitive system operates to analyze an input question and generate a final response. In an initial question input stage 310, the QA pipeline 108 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 108, i.e., the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referenced to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?" the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 140 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 108, in stage 350, then performs a deep analysis and comparison of the language of the input question and the language of each hypothesis or "candidate answer," as well as performs evidence scoring to evaluate the likelihood that the particular hypothesis is a correct answer for the input question. As described in FIG. 1, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e., a measure of confidence in the hypothesis. There are various ways of generating such scores depending upon the particular analysis being performed. In general, however, these algorithms look for particular terms, phrases, or patterns of text that are indicative of terms, phrases, or patterns of interest and determine a degree of matching with higher degrees of matching being given relatively higher scores than lower degrees of matching.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 108 and/or dynamically updated. For example, the weights for scores generated by algorithms that identify exactly matching terms and synonyms may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 108 that identifies a manner by which these scores may be combined to generate a confidence score or measure for the individual hypotheses or candidate answers. This confidence score or measure summarizes the level of confidence that the QA pipeline 108 has about the evidence that the candidate answer is inferred by the input question, i.e., that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

Figure 4:
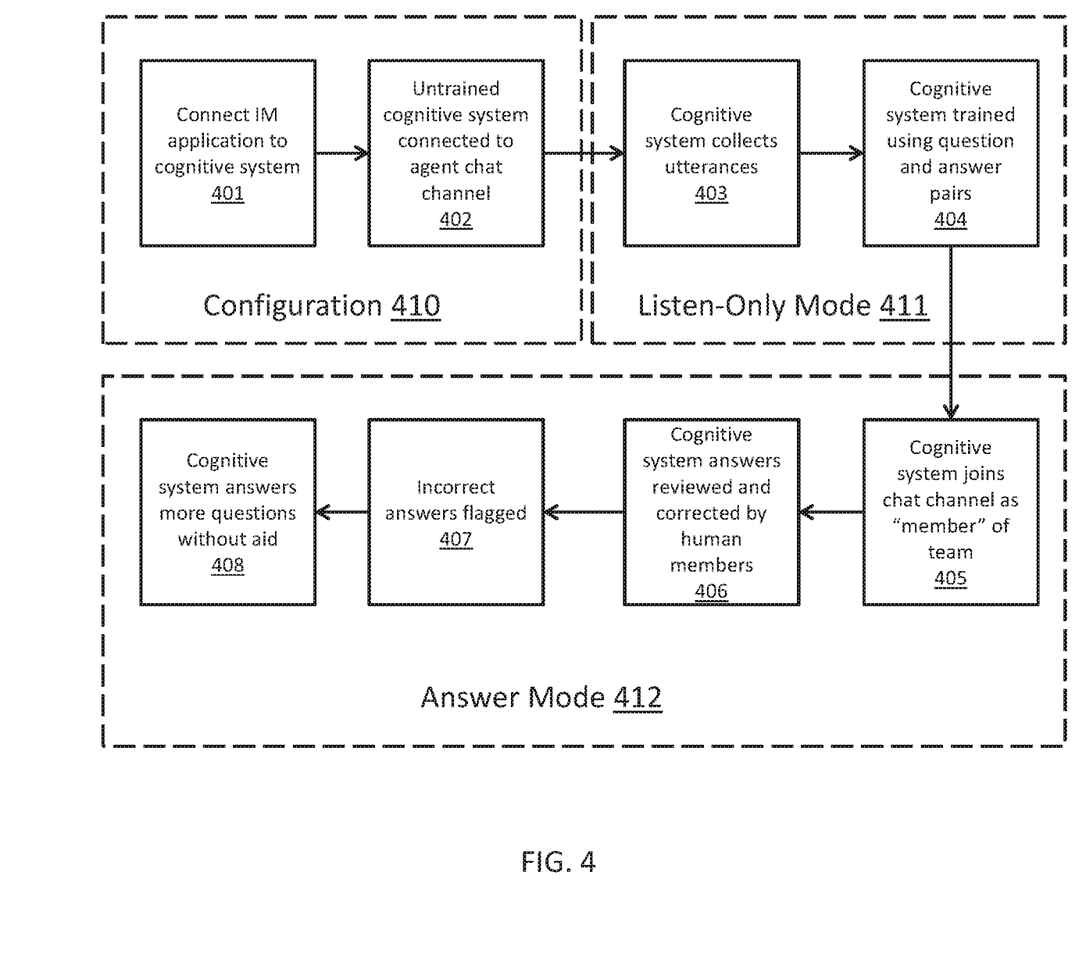
FIG. 4 illustrates a flowchart showing the integration process by which a cognitive system can be introduced into a working call center without disrupting the call center's functionality, according to illustrative embodiments as described herein.

FIG. 4 illustrates a flowchart showing the integration process by which a cognitive system can be introduced into a working call center without disrupting the call center's functionality, according to illustrative embodiments as described herein. In the configuration phase 410, the IM application can be connected to the cognitive system 401 as previously described in FIG. 1. As part of the connection, the untrained cognitive system can be connected to a particular call center agent chat channel 402.

Once integrations have been established between the IM application and the cognitive system, the call center QA system can enter one of two modes: listen-only mode 411 and answer mode 412. In listen-only mode 411, the cognitive system can receive and collect all utterances in real-time from the chat channel 402 into a corpus. Utterances can include both call center agent questions as well as the answers provided by the subject matter experts or call center managers. In an embodiment, all utterances that do not include a question or answer can be excluded from collection. After collection, the cognitive system can be trained using the corpus of question and answer pairs 404 generated from the utterances 403, which can be generated in the manner described in FIGS. 1 and 3. In listen-only mode, the system can internally propose answers to one or more additional questions asked by the call center agents, analyze those answers, and incorporate the analysis of the proposed answers into future question analysis. All ingestion, analysis, and answer generation can be performed without any external notifications made to the call center agents, call center managers, or subject matter experts. On-topic questions can be used to establish ground truth and train the cognitive system in accordance to best practices for adapting a probabilistic cognitive system for the particular use case. Additionally, one or more experiments can be run in listen-only mode 411 to ensure the call center QA system is running at an accuracy level acceptable to move into answer mode 412.

In answer mode 412, the cognitive system can receive all utterances from one or more chat channels. However, in answer mode 412, the cognitive system can join the chat channel as a member of the team 405, with permissions to provide responses to utterances posed by call center agents. Each utterance can be processed by the cognitive system, and if a confident response if produced, the response can be passed back out the chat channel as an answer. Confidence thresholds can be controlled by the cognitive system. In an embodiment, all members of the chat channel can have the ability to see the response generated by the cognitive system. The cognitive system answers can be reviewed and corrected by human members 406. In an embodiment, expert team members and call center managers can decide if the answer is appropriate, and can flag incorrect or incomplete answers 407. In an alternate embodiment, flagged answers will not show to all members of the chat channel. Over time, the cognitive system can improve based on analysis of the flagged answers, leading to a higher number of answers exceeding the confidence threshold, which in turn leads to more questions being answered by the cognitive system without human aid 408. As the cognitive system assumes a higher workload, the call center managers and subject matter experts can focus on particularly difficult questions, which allows the knowledge to scale.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method, in a data processing system comprising a processor and a memory comprising instructions which are executed by the processor to cause the processor to implement a call center question and answer system, the method comprising:
    ingesting, through an instant messaging application, one or more original questions from one or more call center agents;
    ingesting, through the instant messaging application, one or more answers from the one or more call center agents, the one or more answers associated with the one or more original questions;
    analyzing, through a cognitive system, each of the one or more answers associated with the one or more original questions;
    incorporating the analysis of the one or more answers into the analysis of the one or more answers and the one or more original questions;
    receiving, by one of the one or more call center agents, one or more additional questions from a customer to which the call center agent cannot answer;
    receiving, through the instant messaging system, the one or more additional questions;
    determining, in real-time, one or more proposed answers to each additional question based on analysis of the one or more original questions and answers;
    determining, in real-time, a confidence score for each of the one or more proposed answers;
    if the confidence score of the proposed answer exceeds a confidence threshold, providing, in real-time, the proposed answer to the call center agent;
    receiving, in real-time, through a feedback module, feedback on the proposed answer from one or more subject matter experts or call center managers; and
    incorporating, in real-time, the feedback on the proposed answer into the analysis of the one or more original questions and the one or more additional questions.

2. The method as recited in claim 1, further comprising:
    utilizing a plug-in module to moderate the interactions between the cognitive system and the instant messaging application.

3. The method as recited in claim 2, wherein the plug-in module utilizes one or more registration commands to identify the one or more questions and answers sent between the instant messaging application and the cognitive system.

4. The method as recited in claim 1, further comprising:
    ingesting, in real-time, through the instant messaging application, one or more answers provided by the one or more subject matter experts.

5. The method as recited in claim 1, further comprising:
    providing, in real-time, the proposed answer to the call center agent through the instant messaging application.

6. The method as recited in claim 1, further comprising:
    using the cognitive system, in real-time, to determine the confidence threshold needed to provide a proposed answer.

7. The method as recited in claim 1, further comprising:
    flagging, in real-time, through the feedback module, one or more answers as unsuitable for display.

8. A computer program product for question and answer generation, the computer program product comprising a computer readable storage medium having program instructions embodied therewith, the program instructions executable by a processor to cause the processor to:
    ingest, through an instant messaging application, one or more original questions from one or more call center agents;
    ingest, through the instant messaging application, one or more answers from the one or more call center agents, the one or more answers associated with the one or more original questions;
    analyze, through a cognitive system, the one or more answers associated with the one or more original questions;
    incorporate the analysis of the one or more answers into the analysis of the one or more answers and the one or more original questions;
    receive, by one of the one or more call center agents, one or more additional questions from a customer to which the call center agent cannot answer;
    receive, through the instant messaging system, the one or more additional questions;
    determine, in real-time, one or more proposed answers to each additional question based on analysis of the one or more original questions and answers;
    determine, in real-time, a confidence score for each of the one or more proposed answers;
    if the confidence score of the proposed answer exceeds a confidence threshold, provide, in real-time, the proposed answer to the call center agent;
    receive, in real-time, through a feedback module, feedback on the proposed answer from one or more subject matter experts or call center managers; and
    incorporate, in real-time, the feedback into the analysis of the one or more original questions and the one or more additional questions.

9. The computer program product as recited in claim 8, wherein the processor utilizes a plug-in module to moderate the interactions between the cognitive system and the instant messaging application.

10. The computer program product as recited in claim 9, wherein the plug-in module utilizes one or more registration commands to identify the one or more questions and answers sent between the instant messaging application and the cognitive system.

11. The computer program product as recited in claim 8, wherein the processor ingests, in real-time, through the instant messaging application, one or more answers provided by the one or more subject matter experts.

12. The computer program product as recited in claim 8, wherein the processor provides, in real-time, the proposed answer to the call center agent through the instant messaging application.

13. The computer program product as recited in claim 8, wherein the processor uses the cognitive system to determine, in real-time, the confidence threshold needed to provide a proposed answer.

14. The computer program product as recited in claim 13, wherein the processor flags, in real-time, through the feedback module, one or more answers as unsuitable for display.

15. A method for cognitive system integration into a call center using an instant messaging application, the method comprising:
    ingesting one or more original questions entered into the instant messaging application by one or more call center agents;
    ingesting one or more answers associated with the one or more original questions entered into the instant messaging application, the one or more answers being entered into the instant messaging application by the one or more call center agents;
    analyzing, through a cognitive system, each of the one or more answers associated with the one or more original questions;
    incorporating the analysis of the one or more answers into the analysis of the one or more answers and the one or more original questions;
    receiving, by one of the one or more call center agents, one or more additional questions from a customer to which the call center agent cannot answer through the instant messaging system;
    determining, in real-time, one or more proposed answers to each additional question based on analysis of the one or more original questions and answers by a cognitive system;
    determining, in real-time, a confidence score for each of the one or more proposed answers;
    if the confidence score of the proposed answer exceeds a confidence threshold, providing, in real-time, the proposed answer to the call center agent;
    receiving, in real-time, feedback on the proposed answer from one or more subject matter experts or call center managers through a feedback module; and
    incorporating, in real-time, the feedback on the proposed answer into the analysis of the one or more original questions and the one or more additional questions.

16. The method as recited in claim 15, further comprising:
    utilizing a plug-in module to moderate the interactions between the cognitive system and the instant messaging application.

17. The method as recited in claim 16, wherein the plug-in module utilizes one or more registration commands to identify the one or more questions and answers sent between the instant messaging application and the cognitive system.

18. The method as recited in claim 15, further comprising:
    ingesting, in real-time, one or more answers provided by the one or more subject matter experts through the instant messaging application.

19. The method as recited in claim 15, further comprising:
    providing, in real-time, the proposed answer to the call center agent through the instant messaging application.

20. The method as recited in claim 15, further comprising:
    using the cognitive system to determine, in real-time, the confidence threshold needed to provide a proposed answer.

* * * * *